May 20, 1941.  F. M. DARNER ET AL  2,242,816
TUBE ENTERING END DEPRESSING DEVICE
Filed Aug. 16, 1939  2 Sheets-Sheet 1
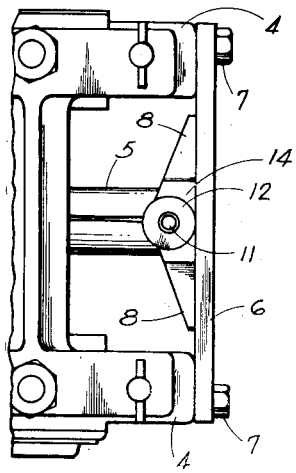
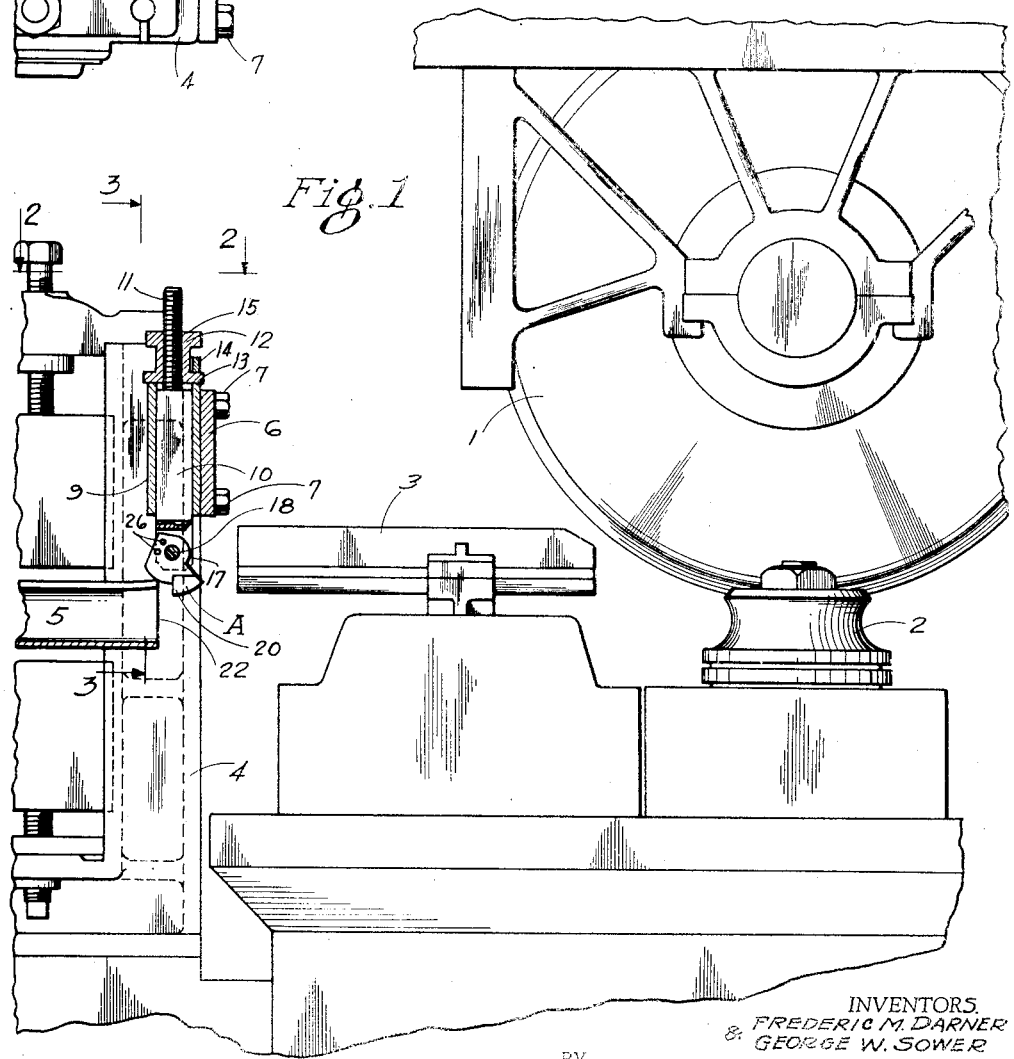
INVENTORS.
FREDERIC M. DARNER
& GEORGE W. SOWER
BY
ATTORNEYS

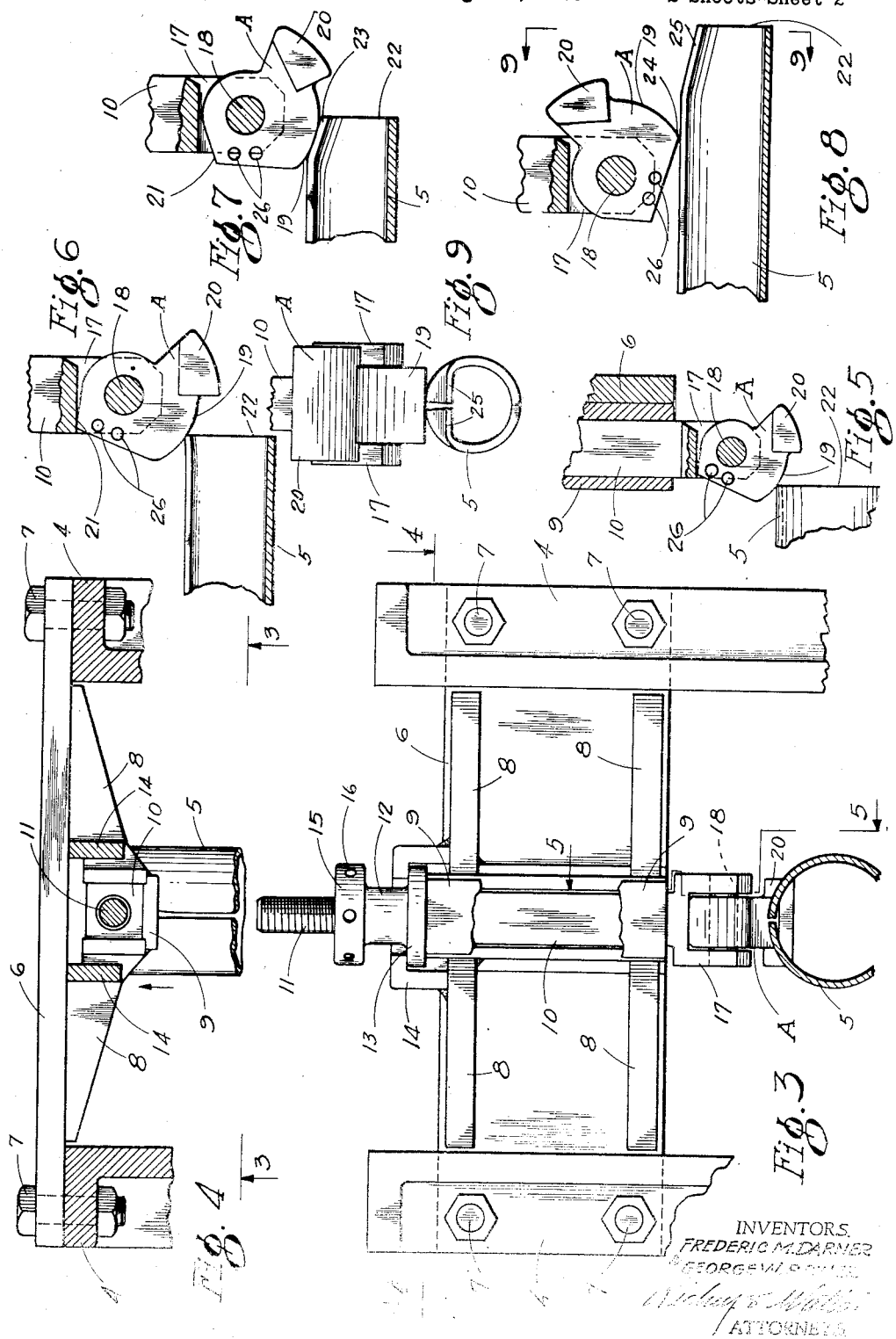

Patented May 20, 1941

2,242,816

UNITED STATES PATENT OFFICE 2,242,816

TUBE ENTERING END DEPRESSING DEVICE

Frederic M. Darner, Shaker Heights, and George W. Sower, University Heights, Ohio, assignors, by mesne assignments, to Republic Steel Corporation, Cleveland, Ohio, a corporation of New Jersey Application August 16, 1939, Serial No. 290,436

7 Claims. (Cl. 219—6)

This invention relates to the manufacture of welded pipe or tubing and more particularly to certain improvements in apparatus for preparing the end of an open-seam tube for entering into the welding throat of an electrical resistance welding machine.

In the electrical welding of pipe or tubing it is common practice to employ a pair of disc electrodes which are rotatably mounted and connected to a suitable source of welding current by any desired contacting arrangement. Pressure rolls are mounted adjacent the point of contact of the electrodes with the tube to complete the welding throat and to supply the pressure necessary to force the edges of the tube into proper contact. The electrodes and the side pressure rolls combined provide a passage through which the tube must pass and which is normally slightly smaller in cross-section than the cross-section of the unwelded tube which approaches the welding throat. In the manufacture of welded tubing, lengths of strip or skelp are usually run through a forming machine, comprising a series of roll stands or passes which form the flat strip into open-seam tubular form, and from the forming machine the unwelded tube moves on to the welding throat.

When such a flat strip of metal is formed into open-seam tubular form preparatory to welding the ends tend to flare somewhat at the seam, causing an enlargement of the tube and a distortion of its proper cross-sectional shape such that, when such a flared end enters the welding throat, the flared lips adjacent the seam may strike the grooves in the electrodes with resultant gouging or scratching of the relatively soft copper surface of the electrodes. Gouges and nicks so formed interfere with proper contact between the electrodes and the tube and may cause arcing or burning both of the electrode and the tube being welded.

It is among the objects of the present invention to provide means for preventing damage to the electrodes of an electrical resistance tube welding machine due to impact of the open tube end against the electrode surface. Other objects of our invention are the provision of an improved apparatus for forming the advancing open end of a tube preparatory to entering the welding throat of an electrical welding machine; the provision of an automatic device which will form the advancing front ends of each succeeding length of strip or skelp in such a way that it will enter the welding throat without damage to the electrodes; the provision of such an automatic end forming device which may readily be installed on existing welding machines, which may be quickly adjusted to handle different sizes of tube and which is extremely rugged, economical to manufacture and entirely automatic in operation, needing no attention whatever from the operator of the machine after it is once installed and set for the particular size of tube being welded.

The above and other objects of our invention will appear from the following description of a preferred embodiment thereof, reference being had to the accompanying drawings, in which—

Figure 1 is a side elevation of a diagrammatically illustrated tube welding machine showing my tube end depressing device in operating position and in vertical cross-section for purposes of clearer illustration.

Figure 2 is a plan view taken substantially on line 2—2 of Figure 1.

Figure 3 is an enlarged vertical cross-sectional view taken on line 3—3 of Figures 1 and 4.

Figure 4 is a horizontal cross-sectional view taken on line 4—4 of Figure 3.

Figure 5 is a fragmentary cross-sectional elevation taken on line 5—5 of Figure 3.

Figure 6 is a detached illustrative view of the pivoted tube depressing iron showing the end of a tube just striking the iron as it advances toward the welding throat.

Figure 7 is a view similar to Figure 6 but illustrating the tube in a more advanced position than shown in Figure 6.

Figure 8 is a view similar to Figures 6 and 7 showing the tube end advanced beyond the depressing iron.

Figure 9 is an end elevation taken on line 9—9 of Figure 8 and illustrating the form of the tube end after it has passed below the depressing iron.

In Figure 1 of the drawings a tube welding machine is diagrammatically illustrated including grooved roller electrodes 1 and side pressure rolls 2 which are disposed below the electrodes 1 and which co-act with the electrodes to form a welding throat through which the tube passes and in which the welding operation takes place. A seam guide 3 is disposed just ahead of the welding throat and is adapted to enter into the open seam of the tube and guide it into the welding throat.

The ends of the tube forming mill housing are shown at 4 and this mill may comprise a plurality of rolls which successively fold the advancing skelp transversely into tubular form.

It will be understood that the tube 5 in Figure 1 has just left the last roll pass of the forming mill and is supported thereby sufficiently to make the operation of the end depressing device possible as will be later explained. To support our improved end depressing device we provide a transversely extending bar 6 which is secured to the ends 4 of the forming mill housing by suitable bolts 7. Brackets 8 are attached to the bar 6 and these support the vertically extending rectangular guideway 9 through which the rectangular shank 10 extends. As is seen in Figure 1, the shank 10 carries an upwardly extending screw portion 11 which is engaged by an adjusting nut 12. The nut 12 is provided with a bottom flange 13 disposed within a cap member 14 which prevents lifting of the nut while permitting rotation thereof. The top flange 15 of the nut 12 is provided with holes 16 to accommodate an operating bar or handle.

It will be observed that rotation of the nut 12 in one direction will lift the screw 11 and shank 10 while rotation in the opposite direction will lower these elements relative to the path of the tube 5 therebelow. The lower end of the shank 10 is formed in the shape of a yoke 17 through which a pin 18 extends. The tube end depressing iron, which is generally indicated on the drawings by the reference character A, is pivotally mounted on the pin 18 and is positioned directly above the open seam of the tube as it advances toward the welding throat.

Referring particularly to Figures 6 to 9, the iron A includes a curved tube end depressing surface 19 which is pivotally movable about the center of the supporting pin 18, a weight portion 20 which is adapted automatically to return the iron to tube engaging position after the back end of a length of tube has passed through the machine, and a stop portion or corner 21 which engages the top of the slot in the yoke 17 and accurately locates the iron A in proper tube end engaging position.

In Figures 1 and 6 the advancing end 22 of the tube 5 is seen to be flared slightly and the corners of the edge of the tube immediately adjacent the open seam are shown as just striking the depressing surface 19 of the iron A which is disposed in the position it naturally assumes when a tube is not passing through the machine. The iron A drops into this position due to the effect of the weight 20 which holds the stop corner 21 against the end of the slot in the yoke 17. As the tube advances under the driving influence of the rolls of the forming mill the end 22 must pass below the surface 19 of the iron A and this will result in an angular bending down or depressing of the top portion of the tube end. Figure 7 shows the tube 5 partially advanced under the iron A. The end has been depressed a certain degree as seen at 23 and the iron A has rolled about its axis 18, the weight 20 being lifted and the stop 21 being moved downwardly. As the tube moves on toward the welding throat the iron A is rotated further into the position shown in Figure 8 until only the corner 24 of the iron is resting upon the surface of the tube 5 at the seam and the depressing action of the iron is completely finished. The advancing end of the tube has been depressed in a slanting manner, as seen at 25. This end depressing is also seen in Figure 9 and it will be observed that the harmful flaring of the tube end has been completely eliminated.

This depressing of the tube end removes the projecting sharp corners and edges of the tube which might harm the electrodes as they enter the welding throat and the tube end is placed in such condition that it will readily enter the welding throat without scratching or gouging either the electrodes or the side pressure rolls.

When the rear end of the particular length of skelp being formed and welded passes beneath the iron A the weight 20 will cause the iron immediately to drop down again into the position shown in Figures 1 and 6 where it is ready automatically to depress the end of the next tube which is fed to the welding throat.

By turning the screw 12 the vertical position of the iron A can be varied and thus the amount of depression imparted to the end of any particular size of tube may be increased or decreased. Also, the iron A may be properly positioned by this adjusting means to depress the ends of tubes of different diameters. In Figures 5 to 8 inclusive, holes 26 are shown in the portion of the iron A adjacent the stop corner 21. These are merely to lighten this portion of the iron and make more positive the effect of the weight in returning the iron to tube engaging position, as shown in Figure 6, after it is released from the position shown in Figure 2 by passage of the rear end of a strip.

Although we have described the illustrated embodiment of our invention in considerable detail it will be understood by those skilled in the art that numerous variations and modifications may be made in the specific form and arrangement of the elements making up our invention, and we do not, therefore, wish to be limited to the particular embodiment herein shown and described, but claim as our invention all forms thereof coming within the scope of the appended claims.

We claim:

1. The combination of a former for forming strip steel into a tubular blank having opposed longitudinal edges and for propelling said blank axially, an electric welder including rotary electrodes and pressure rollers constituting a welding throat through which the former propels said blank, and means engageable with the leading end of the blank before it engages the electrodes for deforming inwardly axially short lengths of the longitudinal edge portions of the blank.

2. The combination of a former for forming strip steel into a tubular blank having opposed longitudinal edges and for propelling said blank axially, an electric welder including rotary electrodes and pressure rollers constituting a welding throat through which the former propels said blank, and means engageable with the leading end of the blank before it engages the electrodes for deforming inwardly axially short lengths of the longitudinal edge portions of the blank, said means comprising a rotatably mounted iron which is rotated through a partial revolution by engagement with said blank.

3. The combination of a former for forming strip steel into a tubular blank having opposed longitudinal edges and for propelling said blank axially, an electric welder including rotary electrodes and pressure rolle. constituting a welding throat through which the former propels said blank, and means engageable with the leading end of the blank before it engages the electrodes for deforming inwardly axially short lengths of the longitudinal edge portions of the blank, said deforming means being movable out of deforming engagement with said blank after an axially short length of said blank has been so deformed thereby.

4. The combination of a former for forming strip steel into a tubular blank having opposed longitudinal edges and for propelling said blank axially, an electric welder including rotary electrodes and pressure rollers constituting a welding throat through which the former propels said blank, and means engageable with the leading end of the blank before it engages the electrodes for deforming inwardly axially short lengths of the longitudinal edge portions of the blank, said means comprising a rotatably mounted iron having a circumferential short curved surface to engage said blank.

5. The combination of a former for forming strip steel into a tubular blank having opposed longitudinal edges and for propelling said blank axially, an electric welder including rotary electrodes and pressure rollers constituting a welding throat through which the former propels said blank, means engageable with the leading end of the blank before it engages the electrodes for deforming inwardly axially short lengths of the longitudinal edge portions of the blank, said means comprising a rotatably mounted iron having a circumferential short curved surface to engage said blank, and stop means to prevent rotation of said iron after said curved surface has moved out of deforming engagement with said blank.

6. The combination of a former for forming strip steel into a tubular blank having opposed longitudinal edges and for propelling said blank axially, an electric welder including rotary electrodes and pressure rollers constituting a welding throat through which the former propels said blank, and means engageable with the leading end of the blank before it engages the electrodes for deforming inwardly axially short lengths of the longitudinal edge portions of the blank, said means comprising a rotatably mounted iron which is rotated through a partial revolution by engagement with said blank, and weighted means to return said iron to its starting position when the trailing end of a blank passes there-beyond.

7. The combination of a former for forming strip steel into a tubular blank having opposed longitudinal edges and for propelling said blank axially, an electric welder including rotary electrodes and pressure rollers constituting a welding throat through which the former propels said blank, and means engageable with the leading end of the blank before it engages the electrodes for deforming inwardly axially short lengths of the longitudinal edge portions of the blank, said means comprising a rotatably mounted iron which is rotated through a partial revolution by engagement with said blank, and stop means to prevent rotation of said iron beyond a predetermined extent.

FREDERIC M. DARNER.
GEORGE W. SOWER.